US012033486B2

(12) United States Patent
Shao et al.

(10) Patent No.: US 12,033,486 B2
(45) Date of Patent: *Jul. 9, 2024

(54) METHODS AND INTERNET OF THINGS (IoT) SYSTEMS FOR HANDLING EMERGENCY BASED ON CALL CENTER OF SMART GAS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,705

(22) Filed: Apr. 12, 2023

(65) Prior Publication Data

US 2023/0252877 A1   Aug. 10, 2023

(30) Foreign Application Priority Data

Mar. 9, 2023   (CN) .......................... 202310219945.1

(51) Int. Cl.
*G08B 21/16* (2006.01)
*G08B 25/00* (2006.01)
*H04W 76/50* (2018.01)

(52) U.S. Cl.
CPC .......... *G08B 21/16* (2013.01); *G08B 25/006* (2013.01); *H04W 76/50* (2018.02)

(58) Field of Classification Search
CPC ............ G05B 23/0283; G05B 23/0289; G08B 25/08; G08B 21/16; G16Y 10/03
See application file for complete search history.

(56) References Cited

U.S. PATENT DOCUMENTS

2017/0325056 A1\* 11/2017 Mehta ................ H04W 4/02
2018/0082565 A1\*  3/2018 Braiman ............. G08B 25/14
(Continued)

FOREIGN PATENT DOCUMENTS

CA       2524417 A1   4/2007
CN   105405062 A    3/2016
(Continued)

OTHER PUBLICATIONS

"Call Center", Web page <https://baike.baidu.com/item/%E5%91%BC%E5%8F%AB%E4%B8%AD%E5%BF%83/2195981>, Mar. 20, 2022.

(Continued)

*Primary Examiner* — Mirza F Alam
(74) *Attorney, Agent, or Firm* — METIS IP LLC

(57) ABSTRACT

The embodiments of the present disclosure provide methods and Internet of Things (IoT) systems for handling an emergency based on a call center of smart gas. The method may be implemented through an IoT system for handling an emergency based on a call center of smart gas. The IoT system may include a smart gas user platform, a smart gas service platform, a smart gas management platform, a smart gas sensor network platform, and a smart gas object platform. The method performed by the smart gas management platform may comprise: obtaining information of a gas emergency based on a call answered by the call center of smart gas; determining severity of the gas emergency based on the information of the gas emergency; and automatically determining an emergency response plan of the gas emergency based on the information of the gas emergency and the severity of the gas emergency.

8 Claims, 5 Drawing Sheets

(56) References Cited

U.S. PATENT DOCUMENTS

| | | | |
|---|---|---|---|
| 2022/0303380 A1* | 9/2022 | Martin | H04W 4/02 |
| 2022/0326690 A1* | 10/2022 | Cella | H04W 4/70 |
| 2023/0034481 A1* | 2/2023 | Benton | G08B 17/10 |

FOREIGN PATENT DOCUMENTS

| | | | |
|---|---|---|---|
| CN | 105447636 A | 3/2016 | |
| CN | 103684874 B | 1/2017 | |
| CN | 107392416 A | 11/2017 | |
| CN | 110266900 A | 9/2019 | |
| CN | 110929085 A | 3/2020 | |
| CN | 109040486 B | 6/2020 | |
| CN | 112200709 A | 1/2021 | |
| CN | 112241924 A | 1/2021 | |
| CN | 112396259 A | 2/2021 | |
| CN | 110162611 B | 3/2021 | |
| CN | 112668752 A | 4/2021 | |
| CN | 113283915 A | 8/2021 | |
| CN | 113374946 A | 9/2021 | |
| CN | 114677043 A | 6/2022 | |
| CN | 112235471 B | 8/2022 | |
| CN | 115330361 A | 11/2022 | |
| CN | 115356978 A | 11/2022 | |
| CN | 115545967 A | 12/2022 | |
| CN | 218032661 U | 12/2022 | |

OTHER PUBLICATIONS

Xiao, Long, Research on GIS Based Urban Gas Emergency Auxiliary Decision Model, Chinese Master's Theses Full-text Database Basic Science Series, 2012, 69 pages.

Cui, Zhongyi, Heightening Gas Industry Emergency Response Capability with Information Management Technology, Public Utilities, 2010, 5 pages.

Zhai, Xianglin et al., Discussion on the Design of Intelligent Urban Gas Transmission and Distribution System, Petro & Chemical Equipment, 2021, 4 pages.

Shao, Zehua et al., Research on Gateway Technology for IoT Operation System of Intelligent Gas Meter, Gas & Heat, 2022, 4 pages.

\* cited by examiner

METHODS AND INTERNET OF THINGS (IoT) SYSTEMS FOR HANDLING EMERGENCY BASED ON CALL CENTER OF SMART GAS

CROSS-REFERENCE TO RELATED APPLICATION

This application claims priority of Chinese Patent Application No. 202310219945.1, filed on Mar. 9, 2023, the contents of which are entirely incorporated herein by reference.

TECHNICAL FIELD

The present disclosure relates to the field of gas management system, and in particular, to methods and Internet of Things (IoT) systems for handling an emergency based on a call center of smart gas.

BACKGROUND

During the supply or use of gas, various gas emergencies may occur, such as interruption of gas supply, sudden change of gas supply pressure, gas leakage, abnormal measurement, etc. If not handled properly or not in time, the gas emergency may cause a major safety accident.

Therefore, it is desirable to provide methods and Internet of Things (IoT) systems for handling an emergency based on a call center of smart gas, which can analyze the gas emergency in time, automatically determine an emergency handling plan, thereby reducing the impact of the emergency, and improving the efficiency of emergency handling.

SUMMARY

One or more embodiments of the present disclosure provide a method for handling an emergency based on a call center of smart gas. The method may be performed by a smart gas management platform of an Internet of Things (IoT) system for handling an emergency based on a call center of smart gas. The method may comprise: obtaining information of a gas emergency based on a call answered by the call center of smart gas; determining severity of the gas emergency based on the information of the gas emergency; and automatically determining an emergency response plan of the gas emergency based on the information of the gas emergency and the severity of the gas emergency.

One or more embodiments of the present disclosure provide an Internet of Things (IoT) system for handling an emergency based on a call center of smart gas. A smart gas management platform of the IoT system for handling an emergency based on a call center of smart gas may be configured to: obtain information of a gas emergency based on a call answered by the call center of smart gas; determine severity of the gas emergency based on the information of the gas emergency; and automatically determine an emergency response plan of the gas emergency based on the information of the gas emergency and the severity of the gas emergency.

One or more embodiments of the present disclosure provide a non-transitory computer-readable storage medium storing computer instructions. When reading the computer instructions in the storage medium, a computer may execute the method for handling an emergency based on a call center of smart gas.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
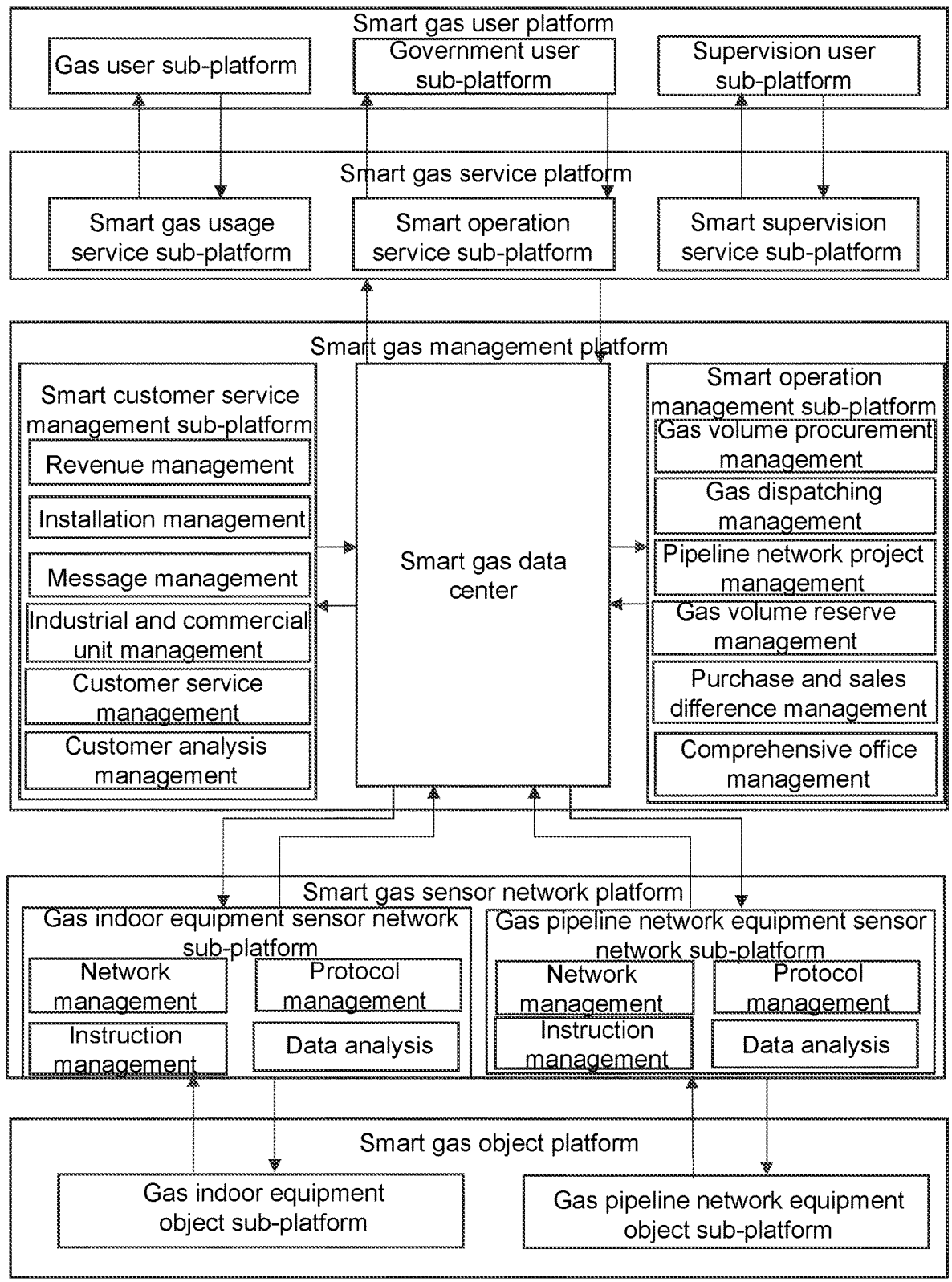
FIG. 1 is a schematic diagram illustrating an exemplary Internet of Things (IoT) system for handling an emergency based on a call center of smart gas according to some embodiments of present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

The flowcharts used in the present disclosure illustrate operations that the system implements according to the embodiments of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary Internet of Things (IoT) system for handling an emergency based on a call center of smart gas according to some embodiments of present disclosure.

As shown in FIG. 1, the IoT system for handling an emergency based on a call center of smart gas may include a smart gas user platform, a smart gas service platform, a smart gas management platform, a smart gas sensor network platform, and a smart gas object platform.

The smart gas user platform may be a platform for interacting with a user. The smart gas user platform may be configured as a terminal device. For example, the terminal device may include a mobile device, a tablet computer, or the like, or any combination thereof. The smart gas user platform may be configured to feedback a reply related to a call of the user and a reminder, a warning, etc. related to an emergency response plan of a gas emergency to the user. In some embodiments, the smart gas user platform may be provided with a gas user sub-platform, a government user sub-platform, and a supervision user sub-platform. The gas user sub-platform may correspond to and interact with a smart gas usage service sub-platform to obtain a safety gas usage service. The government user sub-platform may provide data related to gas operation for a government user. The government user sub-platform may dispatch personnel, materials, equipment, etc. based on the emergency response plan of the gas emergency to implement the emergency response plan of the gas emergency. The government user sub-platform may correspond to and interact with a smart operation service sub-platform to obtain a gas operation service. The supervision user sub-platform may supervise operation of the entire IoT system for handling an emergency based on a call center of smart gas for a supervision user. The supervision user sub-platform may correspond to and interact with a smart supervision service sub-platform to obtain a safety supervision service. The smart gas user platform may perform a bidirectional interaction with the smart gas service platform downwards, send a query instruction related to the emergency response plan of the gas emergency to the smart gas service platform, receive the emergency response plan of the gas emergency uploaded by the smart gas service platform, etc.

The smart gas service platform may be a platform for receiving and transmitting data and/or information. The smart gas service platform may be provided with the smart gas usage service sub-platform, the smart operation service sub-platform, and the smart supervision service sub-platform. The smart gas service platform may interact with the smart gas management platform downwards, send the query instruction related to the emergency response plan of the gas emergency to the smart gas data center, receive the emergency response plan of the gas emergency uploaded by the smart gas data center, etc.

The smart gas management platform may refer to a platform that overall plans and coordinates connection and collaboration between various functional platforms, gathers all information of the IoT, and provides functions of perception management and control management for an IoT operation system. For example, the smart gas management platform may obtain information of the gas emergency, a real-time monitoring situation of a gas pipeline network, etc.

In some embodiments, the smart gas management platform may be provided with a smart customer service management sub-platform, a smart operation management sub-platform, and a smart gas data center. Each management sub-platform may bidirectionally interact with the smart gas data center. The smart gas data center may summarize and store all operation data of the system. Each management sub-platform may obtain the data from the smart gas data center and feedback information related to operation. The smart customer service management sub-platform may be configured to perform revenue management, industrial and commercial unit management, installation management, customer service management, message management, customer analysis management, etc., view customer feedback information, and perform a corresponding reply processing. The smart operation management sub-platform may be configured to perform gas volume procurement management, gas volume reserve management, gas dispatching management, purchase and sales difference management, pipeline network project management, and comprehensive office management, etc., view work order information, staffing, and progress of the pipeline network project, and implement pipeline network project management, etc. The smart operation management sub-platform and the smart customer service management sub-platform may exchange information with the smart gas service platform and the smart gas sensor network platform through the smart gas data center. The smart gas data center may receive the customer feedback information sent by the smart gas service platform, send an instruction for obtaining data related to gas equipment to the smart gas sensor network platform, receive the data related to gas equipment uploaded by the smart gas sensor network platform, and send the customer feedback information and the data related to gas equipment to the smart customer service management sub-platform and the smart operation management sub-platform for analysis and processing.

The smart gas sensor network platform may be a functional platform for managing sensor communication. The smart gas sensor network platform may be configured as a communication network and a gateway to implement functions such as network management, protocol management, instruction management, data analysis, etc. The smart gas sensor network platform may include a gas indoor equipment sensor network sub-platform and a gas pipeline network equipment sensor network sub-platform, which may correspond to a gas indoor equipment object sub-platform and a gas pipeline network equipment object sub-platform, respectively, and may be configured to obtain data related to indoor equipment and data related to pipeline network equipment, respectively. The smart gas sensor network platform may connect the smart gas management platform and the smart gas object platform to implement functions of perceptual information sensor communication and control information sensor communication.

The smart gas object platform may be a functional platform for generating perceptual information and executing control information, and may include the gas equipment and other equipment. The gas equipment may include indoor equipment and pipeline network equipment. The other equipment may include a monitoring device, a temperature sensor, a pressure sensor, etc. The smart gas object platform may also be provided with the gas indoor equipment object sub-platform and the gas pipeline network equipment object sub-platform. The gas indoor equipment object sub-platform may include the indoor equipment, such as a gas meter, a metering device, etc. of a gas user. The gas pipeline network equipment object sub-platform may include the pipeline network equipment, such as a pressure regulating device, a gas gate station compressor, a gas flow meter, a valve control device, a thermometer, a barometer, etc. The smart gas object platform may interact with the smart gas sensor network platform upwards, receive the instruction for obtaining the data related to gas equipment sent by the smart gas sensor network platform, and upload the data related to gas equipment to the corresponding sensor network sub-platform.

In some embodiments of the present disclosure, the transmission or control of the customer feedback information, the data related to gas equipment, and the emergency response plan of the gas emergency may be implemented through the IoT functional architecture of the five platforms, and the closed loop of information flow may be completed, thereby making the information processing of the IoT smoother and more efficient.

Figure 2:
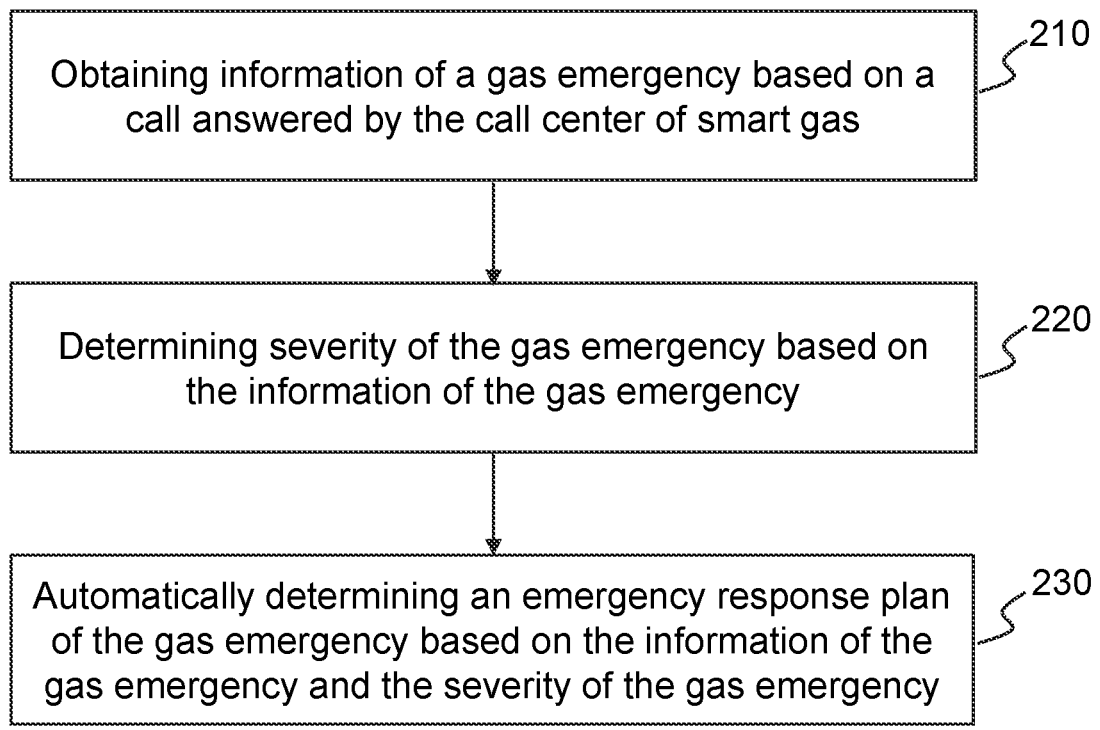
FIG. 2 is a flowchart illustrating an exemplary process of a method for handling an emergency based on a call center of smart gas according to some embodiments of present disclosure.

FIG. 2 is a flowchart illustrating an exemplary process of a method for handling an emergency based on a call center of smart gas according to some embodiments of present disclosure. As shown in FIG. 2, the process 200 may include the following operations. The process 200 may be performed by a smart gas management platform.

In 210, obtaining information of a gas emergency based on a call answered by the call center of smart gas.

The call center of smart gas may refer to a call response center that provides a user with various gas-related services. For example, the call center of smart gas may be a call response center of a gas company or a government gas department. The call center of smart gas may support a plurality of access modes.

The gas emergency may refer to a sudden accident related to gas, such as a gas leakage event, a gas equipment damage event, etc.

The information of the gas emergency may refer to information related to the gas emergency, such as a time, a location, a cause, etc. of the gas emergency.

In some embodiments, the smart gas management platform may obtain the information of the gas emergency in various ways. For example, the smart gas management platform may obtain the information of the gas emergency through speech content of the user based on the call answered by the call center of smart gas. As another example, the smart gas management platform may obtain the information of the gas emergency through a client, a storage device inside or outside IoT system for handling an emergency based on a call center of smart gas, etc.

In 220, determining severity of the gas emergency based on the information of the gas emergency.

The severity may refer to a parameter used to reflect severity of a consequence caused by the gas emergency. The severity may be expressed in various ways. For example, the severity may be represented by a quantitative indicator through a numerical value between 1-10. The larger the numerical value is, the higher the severity may be. As another example, the severity may be represented by an event level, such as a minor level, a general level, a major level, etc.

In some embodiments, the smart gas management platform may determine the severity of the gas emergency in various ways based on the information of the gas emergency. For example, the smart gas management platform may determine the severity of the gas emergency through a result manually input. As another example, the smart gas management platform may determine the severity of gas emergency through historical data. Exemplarily, the smart gas management platform may construct a historical gas emergency information vector based on information of a historical gas emergency, construct a gas emergency information vector based on information of a current gas emergency, and calculate a distance between the gas emergency information vector and the historical gas emergency information vector. If the distance is smaller than a preset threshold, it may be determined that severity of the current gas emergency may be severity of the historical gas emergency.

In some embodiments, the gas emergency may be the gas leakage event. The smart gas management platform may determine severity of the gas leakage event based on the information of the gas emergency and a real-time monitoring situation of a gas pipeline network.

The gas leakage event may refer to an accidental leakage of gas from gas equipment such as a pipeline and a steel cylinder, for example, an event where gas leaks from the pipeline into air, soil, etc.

In some embodiments, the information of the gas emergency may include a caliber of a leakage pipeline and a leakage type.

The caliber of the leakage pipeline may refer to a nominal diameter of a pipeline where a gas leakage occurs. The leakage type may refer to a type of gas diffusion after the gas leakage. For example, the leakage type may be atmospheric diffusion, soil diffusion, etc.

The real-time monitoring situation of the gas pipeline network may refer to information of the gas pipeline network monitored in real time. For example, the real-time monitoring situation of the gas pipeline network may be a real-time pressure value, a pressure value change rate, a real-time gas supply volume, a gas supply volume change rate, etc. of the gas pipeline network in a certain region. The pressure value change rate and the gas supply volume change rate may refer to an average pressure value change rate and an average gas supply volume change rate of the gas pipeline network in the certain region in a certain period of time.

In some embodiments, the smart gas management platform may determine the severity of the gas leakage event through a first preset rule based on the information of the gas emergency and the real-time monitoring situation of the gas pipeline network. The first preset rule may refer to a preset rule for determining the severity. The first preset rule may be determined based on experience. In some embodiments, the smart gas management platform may set a plurality of first preset rules where the information of the gas emergency and the real-time monitoring situation of the gas pipeline network is related to the severity, and use a mean value of the severity obtained based on each preset rule as the severity of the gas leakage event.

In some embodiments, the smart gas management platform may predict the severity of the gas leakage event through a severity prediction model based on the information of the gas emergency and the real-time monitoring situation of the gas pipeline network. Further description about the above may be found in FIG. 3 and the related description thereof.

The severity of the gas leakage event may be determined based on the information of the gas emergency and the real-time monitoring situation of the gas pipeline network and an actual situation of the gas emergency and an actual impact of the gas emergency on the gas pipeline network may be combined to reflect the impact of the gas leakage event in various aspects, so that the severity of the gas leakage event can be determined more accurately.

In 230, automatically determining an emergency response plan of the gas emergency based on the information of the gas emergency and the severity of the gas emergency.

The emergency response plan may refer to a plan for handling the gas emergency. For example, the emergency response plan may include information such as dispatching of resources such as personnel, materials, equipment, etc., determination of an opening and closing plan of a gas valve of a gas gate station, measures taken in an affected region and a surrounding region, determination of a gas replenishment plan, etc. Further description about the above may be found below, in FIG. 4, and the related description thereof.

In some embodiments, the smart gas management platform may determine the emergency response plan of the gas emergency through a second preset rule based on the information of the gas emergency and the severity of the gas emergency. The second preset rule may refer to a preset rule for determining the emergency response plan. The second preset rule may be determined based on experience. For example, the second preset rule may include different emergency response plan levels corresponding to different information of the gas emergency and different severity of the gas emergency. The emergency response plan level may include a minor emergency response plan, a general emergency response plan, a major emergency response plan, etc. Different emergency response plan levels may correspond to different levels of dispatching and different dispatching modes of the resources such as personnel, materials, equipment, etc. Further description about the above may be found in FIG. 4 and the related description thereof.

The information of the gas emergency information may be obtained based on the call answered by the call center of smart gas, the severity of the gas emergency may be determined, and then the emergency response plan may be automatically determined, which can provide an accurate emergency response plan based on the actual situation, shorten a time for determining the emergency response plan, save labor costs, reduce the impact of the emergency, and improve the processing efficiency of the information of the gas emergency, so that a relevant department (e.g., the government user sub-platform, etc.) can obtain and implement the emergency response plan in time.

In some embodiments, the emergency response plan may include the opening and closing plan of the gas valve of the gas gate station. The smart gas management platform may automatically determine the opening and closing plan of the gas valve based on the information of the gas emergency and the severity of the gas emergency.

The gas gate station may refer to a receiving station where natural gas enters an urban pipeline network from a long-distance pipeline, and may be used for gas metering, pressure regulation, distribution, and remote telemetry/remote control. The gas valve may refer to valve equipment of the gas gate station. The opening and closing plan of the gas valve of the gas gate station may refer to information related to opening and closing of the gas valve of the gas gate station. For example, the opening and closing plan of the gas valve may include opening and closing of a plurality of different gas valves. The opening and closing of different gas valves in the opening and closing plan of the gas valve may be represented by a numerical value. For example, the numerical value 0 may represent that the gas valve is closed, and the numerical value 1 may represent that the gas valve is open.

In some embodiments, the smart gas management platform may automatically determine the opening and closing plan of the gas valve according to a third preset rule based on the information of the gas emergency and the severity of the gas emergency. The third preset rule may refer to a preset rule for determining the opening and closing plan of the gas valve. The third preset rule may be set based on experience. For example, the third preset rule may include that when the severity is 1-4, the opening and closing plan of the gas valve is to close the gas valve within 3 km from the location where an emergency occurs in the information of the gas emergency.

In some embodiments, the smart gas management platform may determine that the opening and closing plan of the gas valves is to directly close all corresponding valves in the affected region. Further descriptions about the affected region may be found in FIG. 4 and the related description thereof.

The opening and closing plan of the gas valve may be automatically determined based on the information of the gas emergency and the severity of the gas emergency, and the opening and closing plan of the gas valve may be accurately determined, so that the handling process of the gas emergency can be more efficient.

In some embodiments, the smart gas management platform may determine the affected region and the surrounding region based on the information of the gas emergency; determine a gas supply volume of a gas pipeline network in the affected region and the surrounding region based on the affected region and the surrounding region; and automatically determine the opening and closing plan of the gas valve based on the severity and the gas supply volume.

The affected region may refer to a region affected by gas diffusion. For example, if the location where a gas emergency occurs is (x1, y1, z1), the affected region may be a region within a certain distance from the location (x1, y1, z1).

The surrounding region may refer to a region located within the perimeter of the affected region. For example, the surrounding region may be a region outside the affected region and within a certain distance from a boundary of the affected region.

In some embodiments, the smart gas management platform may determine, based on the information of the gas emergency, the affected region and the surrounding region according to the historical data. For the specific determination mode, please refer to the process for determining the severity of the gas emergency through the historical data, which is not repeated herein.

The gas supply volume may refer to a gas volume provided per unit time. For example, the gas supply volume at point 1 on a gas pipeline 1 may be 1000 $m^3/h$. Further description about the point may be found in FIG. 5 and the related description thereof.

In some embodiments, the smart gas management platform may determine the gas supply volume of the gas pipeline network in the affected region and the surrounding region based on the pipeline network equipment. For example, the smart gas management platform may obtain a real-time gas supply volume of the point 1 on the gas pipeline 1 through a gas flow meter. Further description about the pipeline network equipment, please refer to FIG. 1 and the related descriptions thereof.

In some embodiments, the smart gas management platform may automatically determine the opening and closing plan of the gas valve according to a fourth preset rule based on the severity and the gas supply volume. The fourth preset rule may refer to a preset rule for determining the opening and closing plan of the gas valve. The fourth preset rule may be set based on experience. For example, the fourth preset rule may include that when the severity is 1-4 and the gas supply volume is 0-1500 $m^3/h$, the opening and closing plan of the gas valve is to close the gas valve within 3 km from the location where an emergency occurs in the information of the gas emergency, etc.

In some embodiments, when the severity is low and the gas supply volume is too small after closing, the smart gas management platform may only close part of the gas valves, for example, the gas valve directly connected with the leakage pipeline.

The gas supply volume of the affected region and the surrounding region may be determined based on the information of the gas emergency, and then the opening and closing plan of the gas valve may be determined, so that the determination process of the opening and closing plan of the gas valve can be more reasonable and more in line with the actual situation of the emergency. While the accurate opening and closing plan of the gas valve is determined, duplication and redundant work that may occur in the determination process can be effectively avoided, and the impact on other regions can be minimized on the premise of meeting the needs of gas emergency handling.

In some embodiments, the smart gas management platform may predict the gas supply volume of the gas pipeline network in the affected region and the surrounding region based on the information of the gas emergency; determine whether the gas supply volume satisfies a preset gas supply volume condition; and in response to a determination that the gas supply volume does not satisfy the preset gas supply volume condition, determine a gas replenishment plan and prompt the user. Further description about the above may be found in FIG. 4 and the related description thereof.

In some embodiments, the emergency response plan may also include performing a pipeline network inspection of a preset intensity in the affected region and the surrounding region.

The preset intensity may be expressed in small, medium, and large intensity levels. The more frequent the pipeline network inspection is, the more inspectors are, and the more inspection items are, the greater the preset intensity may be. The preset intensity may be set based on experience. For example, the larger the area of the affected region and/or the surrounding region is, and the higher the degree of population concentration is, etc., the greater the preset intensity of the pipeline network inspection in the affected region and/or the surrounding region that the smart gas management platform may set. The setting of the preset intensity may be related to the information of the gas emergency and the severity of the gas emergency, and a corresponding relationship may be set. The greater the severity is, the greater the preset intensity may be and the greater the intensity of the pipeline network inspection in the affected region and/or the surrounding region may be. The corresponding relationship may be set based on experience. The smart gas management platform may determine the intensity of the pipeline network inspection in the affected region and/or the surrounding region based on the corresponding relationship, and then perform the pipeline network inspection.

By including performing the pipeline network inspection of the preset intensity in the affected region and the surrounding region in the emergency response plan, timely investigation of gas safety hazards in the affected region and the surrounding region may be carried out to avoid repeated gas emergencies.

In some embodiments, the smart gas management platform may generate a remote control instruction based on the emergency response plan and send the remote control instruction to the smart gas service platform, and send the remote control instruction to the smart gas user platform based on the smart gas service platform, so that the smart gas user platform may implement the emergency response plan.

The remote control instruction may refer to an instruction for controlling and dispatching personnel, materials, equipment, etc. to implement the emergency response plan.

In some embodiments, the smart gas management platform may directly generate the corresponding remote control instruction based on the emergency response plan.

In some embodiments, the smart gas management platform may send the generated remote control instruction to the government user sub-platform through the smart operation service sub-platform of the smart gas service platform, so that the government user sub-platform may perform the emergency response plan.

Figure 3:
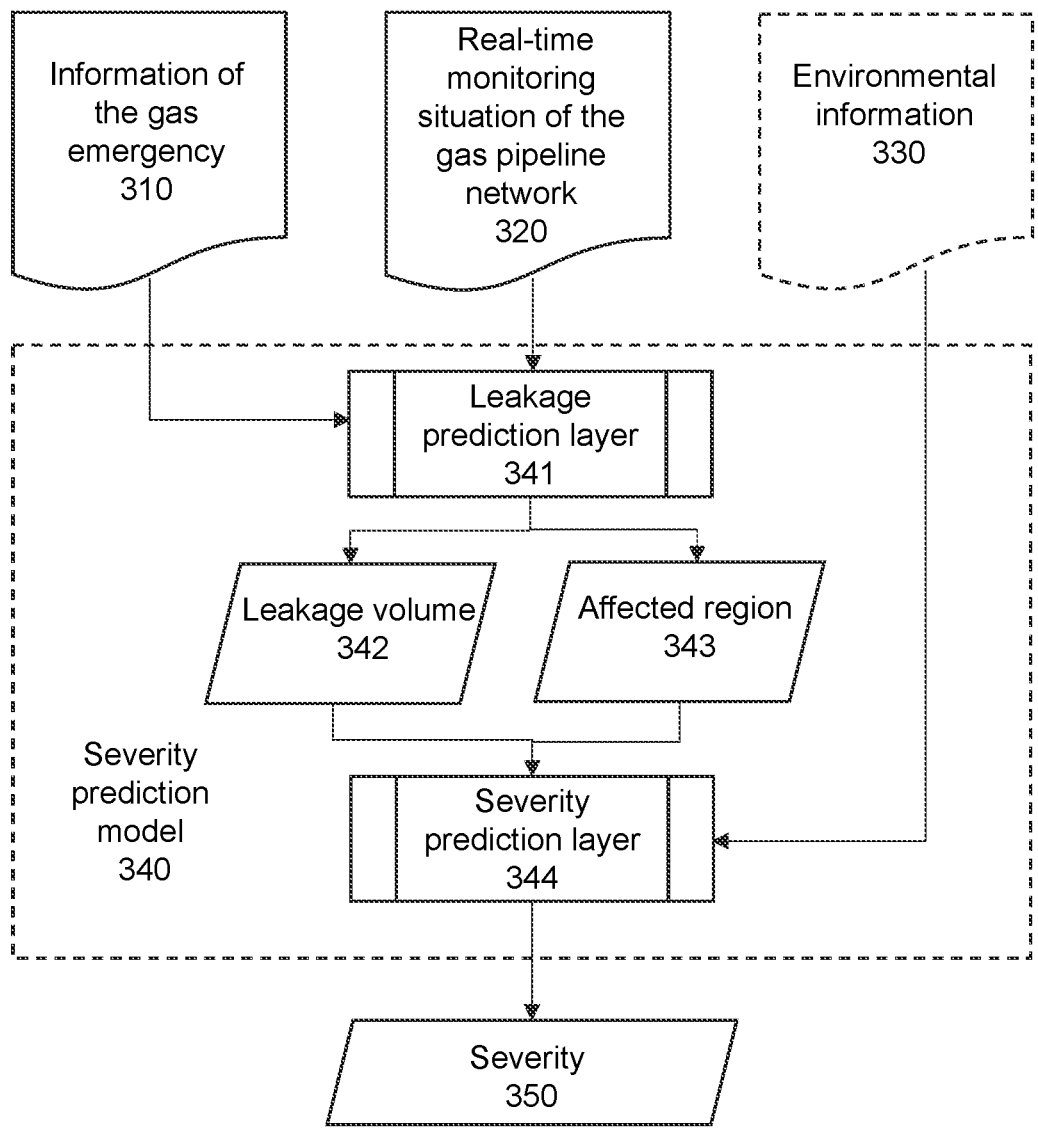
FIG. 3 is a schematic diagram illustrating an exemplary severity prediction model according to some embodiments of the present disclosure.

FIG. 3 is a schematic diagram illustrating an exemplary severity prediction model according to some embodiments of the present disclosure.

In some embodiments, the smart gas management platform may predict severity of a gas leakage event through the severity prediction model based on information of the gas emergency and a real-time monitoring situation of a gas pipeline network.

In some embodiments, the severity prediction model may be a model for determining the severity of the gas leakage event. The severity prediction model may be a machine learning model. For example, the severity prediction model may include a neural network model, a deep neural network model, or the like, or any combination thereof.

In some embodiments, an input of the severity prediction model may include the information of the gas emergency and the real-time monitoring situation of the gas pipeline network, and an output of the severity prediction model may include the severity of the gas leakage event.

In some embodiments, the severity prediction model may be obtained by training a plurality of first training samples with labels. The first training samples may be input into an initial severity prediction model. A loss function may be constructed through the label and a result of the initial severity prediction model, and parameters of the initial severity prediction model may be iteratively updated based on the loss function. When the loss function of the initial severity prediction model satisfies a preset condition, model training may be completed and a trained severity prediction model may be obtained. The preset condition may be that the loss function converges, a count of iterations reaches a threshold, or the like, or any combination thereof.

In some embodiments, the first training sample may include sample information of a gas emergency and a sample real-time monitoring situation of a gas pipeline network. The label may be a sample severity of a gas leakage event corresponding to the sample information of the gas emergency and the sample real-time monitoring situation of the gas pipeline network. The first training sample may be obtained based on historical data. The label of the first training sample may be obtained through manual labelling.

As shown in FIG. 3, the severity prediction model 340 may include a leakage prediction layer 341 and a severity prediction layer 344.

In some embodiments, an output of the leakage prediction layer 341 may be used as an input of the severity prediction layer 344. An output of the severity prediction layer 344 may be used as a final output of the severity prediction model 340.

The leakage prediction layer 341 may be used to determine a leakage volume and an affected region of the gas leakage event. The input of the leakage prediction layer 341 may include the information of the gas emergency 310 and the real-time monitoring situation of the gas pipeline network 320. The output of the leakage prediction layer 341 may include the leakage volume 342 and the affected region 343. In some embodiments, the leakage prediction layer 341 may include a model such as a recurrent neural networks (RNN) model, a convolutional neural networks (CNN) model, etc.

The severity prediction layer 344 may be used to determine the severity of the gas leakage event. The input of the severity prediction layer 344 may include the obtained leakage volume 342 and the affected region 343 and may also include environmental information 330. The output of the severity prediction layer 344 may include the severity 350. The environmental information 330 may refer to information related to an environment when the gas leakage event occurs. For example, the environmental information 330 may include a geographical environment (e.g., an altitude), a weather environment (e.g., a wind direction, a wind speed, a gas pressure, a temperature, etc.), a surrounding building environment (e.g., a building type, a building density, a building height, and an occupancy rate), or the like, or any combination thereof. The smart gas management platform may obtain the environmental information 330 in various feasible ways. In some embodiments, the severity prediction layer 344 may include a model such as a RNN model, a CNN model, etc.

In some embodiments, the leakage prediction layer 341 and the severity prediction layer 344 may be obtained through joint training based on a second training sample. For example, the sample information of the gas emergency and the sample monitoring situation of the gas pipeline network may be input to the leakage prediction layer 341 and the leakage volume 342 and the affected region 343 output by the leakage prediction layer 341 may be obtained. The leakage volume 342 and the affected region 343 output by the leakage prediction layer 341 and the sample environment information may be input to the severity prediction layer 344 and the severity output by the severity prediction layer 344 may be obtained. During the training process, a loss function may be constructed based on a label and an output result of the severity prediction layer 344, parameters of the leakage prediction layer 341 and the severity prediction layer 344 may also be updated until a preset condition is satisfied, and the training may be completed. The preset condition may be that the loss function is smaller than a threshold, the loss function converges, or a training period reaches a threshold, or the like, or any combination thereof.

In some embodiments, the second training samples may include sample information of a gas emergency, a sample monitoring condition of a gas pipeline network, and sample environmental information. The second training samples may be obtained based on historical data. The label of the second training sample may be obtained through manual labelling.

Compared with individual training of each model, the joint training may be performed on the leakage prediction layer 341 and the severity prediction layer 344 using the unified loss function, which can make the overall training efficiency of the severity prediction model 340 higher.

The severity of the gas leakage event may be determined using the severity prediction model, which may be comprehensively determined based on a variety of objective information such as the information of the gas emergency, the real-time monitoring situation of the gas pipeline network, etc. The information of the gas emergency and the real-time monitoring situation of the gas pipeline network may be processed through the severity prediction model, so that the severity of the gas leakage event can be more accurately predicted in combination with the actual situation of the event, the time cost and resource waste required for manual assessment of the severity can be reduced, and the risk of accident caused by a subjective factor affecting a manual assessment result can be reduced.

Figure 4:
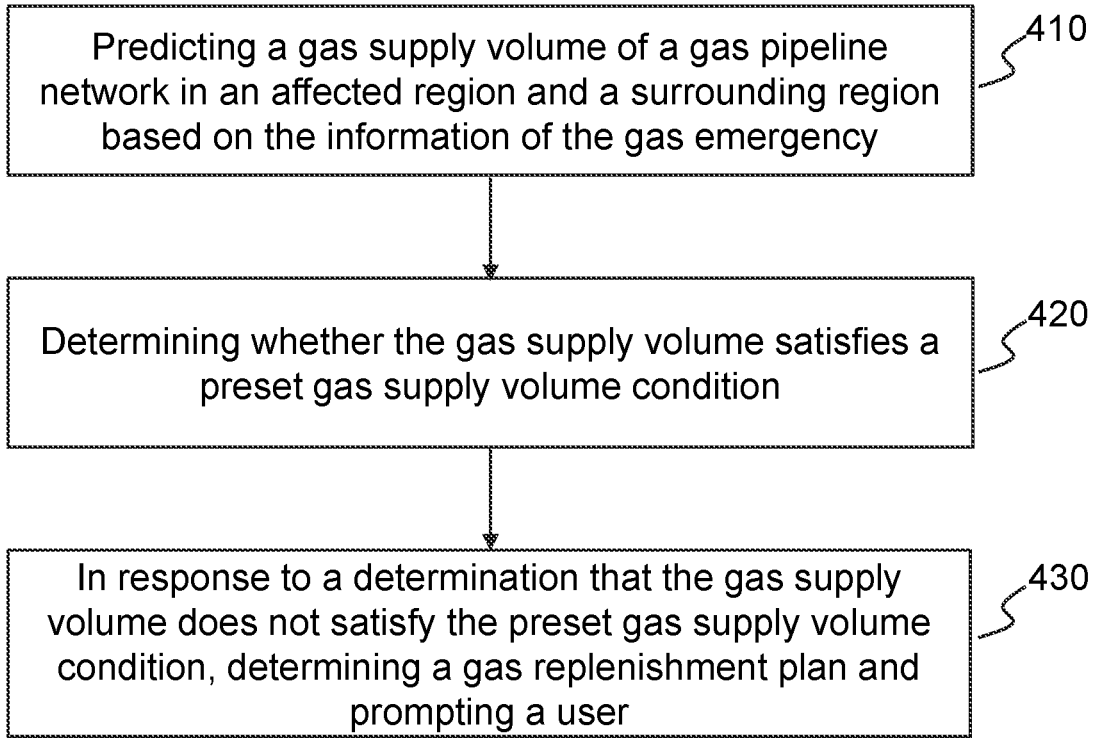
FIG. 4 is a flowchart illustrating an exemplary process for determining a gas replenishment plan according to some embodiments of the present disclosure.

FIG. 4 is a flowchart illustrating an exemplary process for determining of a gas replenishment plan according to some embodiments of the present disclosure. As shown in FIG. 4, the process 400 may include the following operations. The process 400 may be performed by a smart gas management platform.

In 410, predicting a gas supply volume of a gas pipeline network in an affected region and a surrounding region based on information of the gas emergency.

Further description about the affected region, the surrounding region, the gas supply volume of the gas pipeline network, etc. may be found in the related description in FIG. 2.

In some embodiments, the smart gas management platform may determine the affected region based on the information of the gas emergency and a real-time monitoring situation of the gas pipeline network. For example, the smart gas management platform may determine the affected region through a sixth preset rule based on the information of the gas emergency and the real-time monitoring situation of the gas pipeline network. For example, the sixth preset rule may be to determine a region within a certain preset distance range from a location where an emergency occurs in the information of the gas emergency as the affected region. In some embodiments, the smart gas management platform may input the information of the gas emergency and the real-time monitoring situation of the gas pipeline network into a severity prediction model and determine the affected region output by the leakage prediction layer in the severity prediction model as the affected region. The smart gas management platform may also determine the affected region based on the information of the gas emergency and the real-time monitoring situation of the gas pipeline network in other feasible ways.

The affected region of the gas emergency may be predicted by combining data related to the gas emergency such as the information of the gas emergency, the real-time monitoring situation of the gas pipeline network, etc. When the information of the gas emergency and the real-time monitoring situation of the gas pipeline network change, a change of the affected region may be reflected in time, which can be more accurate and real-time than the manual prediction of the affected region, and provide a basis for automatically determining the emergency response plan of the gas emergency.

In some embodiments, the smart gas management platform may predict the gas supply volume of the gas pipeline network in the affected region and the surrounding region based on the information of the gas emergency in various feasible ways. For example, the smart gas management platform may predict, based on the information of the gas emergency, the gas supply volume of the gas pipeline network in the affected region and surrounding regions through various preset corresponding rules of the information of the gas emergency and the corresponding gas supply volumes.

In some embodiments, the smart gas management platform may predict the gas supply volume of the gas pipeline network in the affected region and the surrounding region based on the information of the gas emergency through a gas supply volume prediction model. The description of the gas supply volume prediction model may be found in FIG. 5 and the related description thereof.

In 420, determining whether the gas supply volume satisfies a preset gas supply volume condition.

The preset gas supply volume condition may refer to a condition that the gas supply volume reaches during normal gas supply. For example, the preset gas supply condition may be that the gas supply volume is greater than a gas supply volume threshold. The gas supply volume threshold may be a minimum value of the gas supply volume during normal gas supply.

In some embodiments, the smart gas management platform may determine whether the gas supply volume satisfies the preset gas supply volume condition by comparing the gas supply volume with the preset gas supply volume condition.

In 430, in response to a determination that the gas supply volume does not satisfy the preset gas supply volume condition, determining a gas replenishment plan and prompting the user.

The gas replenishment plan may refer to a plan for replenishing gas supply. For example, the gas replenishment plan may include a small temporary cylinder group gas supply plan, a mobile gasification vehicle gas supply plan, a bottled liquefied gas storage plan, a temporary gas supply pipeline laying plan, etc.

In some embodiments, the smart gas management platform may determine the gas replenishment plan in various feasible ways. The smart gas management platform may determine the gas replenishment plan according to a preset rule. For example, the smart gas management platform may preset priorities for various gas supply plans and determine the gas replenishment plan in order of priority. As another example, the smart gas management platform may determine the gas replenishment plan based on the severity of the gas leakage event or the affected region.

In some embodiments, the smart gas management platform may prompt the user with the gas replenishment plan in various feasible ways. For example, the smart gas management platform may transmit the gas replenishment plan to a gas user sub-platform of a smart gas user platform through a smart gas service platform to prompt the user with the gas replenishment plan.

In some embodiments, the smart gas management platform may predict a pressure value of the gas pipeline network based on the information of the gas emergency; determine whether the pressure value satisfies a preset pressure value condition; and in response to a determination that the pressure value does not satisfy the preset pressure value condition, adjusting an intensity of a pipeline network inspection of the gas pipeline network based on the pressure value. The pressure value may refer to a pressure of the natural gas pipeline.

In some embodiments, the smart gas management platform may predict the pressure value of the gas pipeline network based on the information of the gas emergency in various feasible ways. For example, the smart gas management platform may fit the information of the gas emergency in historical data and the pressure value of the gas pipeline network in the historical data to obtain a fitting relationship. The smart gas management platform may predict, based on the actual information of the gas emergency, the pressure value of the gas pipeline network through the fitting relationship.

The preset pressure value condition may refer to a condition that the pressure value reaches during normal gas supply. For example, the preset pressure value condition may be that the pressure value is within a pressure value range. The pressure value range may refer to a range of the pressure value during normal gas supply. Different types of gas pipelines may have different preset pressure value conditions.

In some embodiments, the smart gas management platform may determine whether the pressure value satisfies the preset pressure value condition by comparing the pressure value with the preset pressure value condition.

In some embodiments, the smart gas management platform may adjust the intensity of the pipeline network inspection of the gas pipeline network based on the pressure value in various feasible ways. For example, when the pressure value does not satisfy the preset pressure value condition, the smart gas management platform may adjust the intensity of the pipeline network inspection of the gas pipeline network, for example, increase the inspection intensity of a pressure regulating device, a valve control device, etc.

The pressure value of the gas pipeline network may be predicted based on the information of the gas emergency. When the pressure value does not satisfy the preset pressure value condition, the intensity of the pipeline network inspection may be adjusted based on the pressure value, so that guidance can be provided for a gas company and a government user who implements the gas emergency to maintain the gas pipeline network and the probability of a future gas emergency may be reduced.

By combining an objective factor such as the information of the gas emergency, the real-time monitoring situation of the gas pipeline network, etc., the gas supply volume of the gas pipeline network in the affected region and the surrounding region when the gas emergency occurs can be accurately predicted and the corresponding gas replenishment plan may be determined, so that the gas emergency can be better handled, and the impact on users in the affected region and the surrounding region can be reduced.

Figure 5:
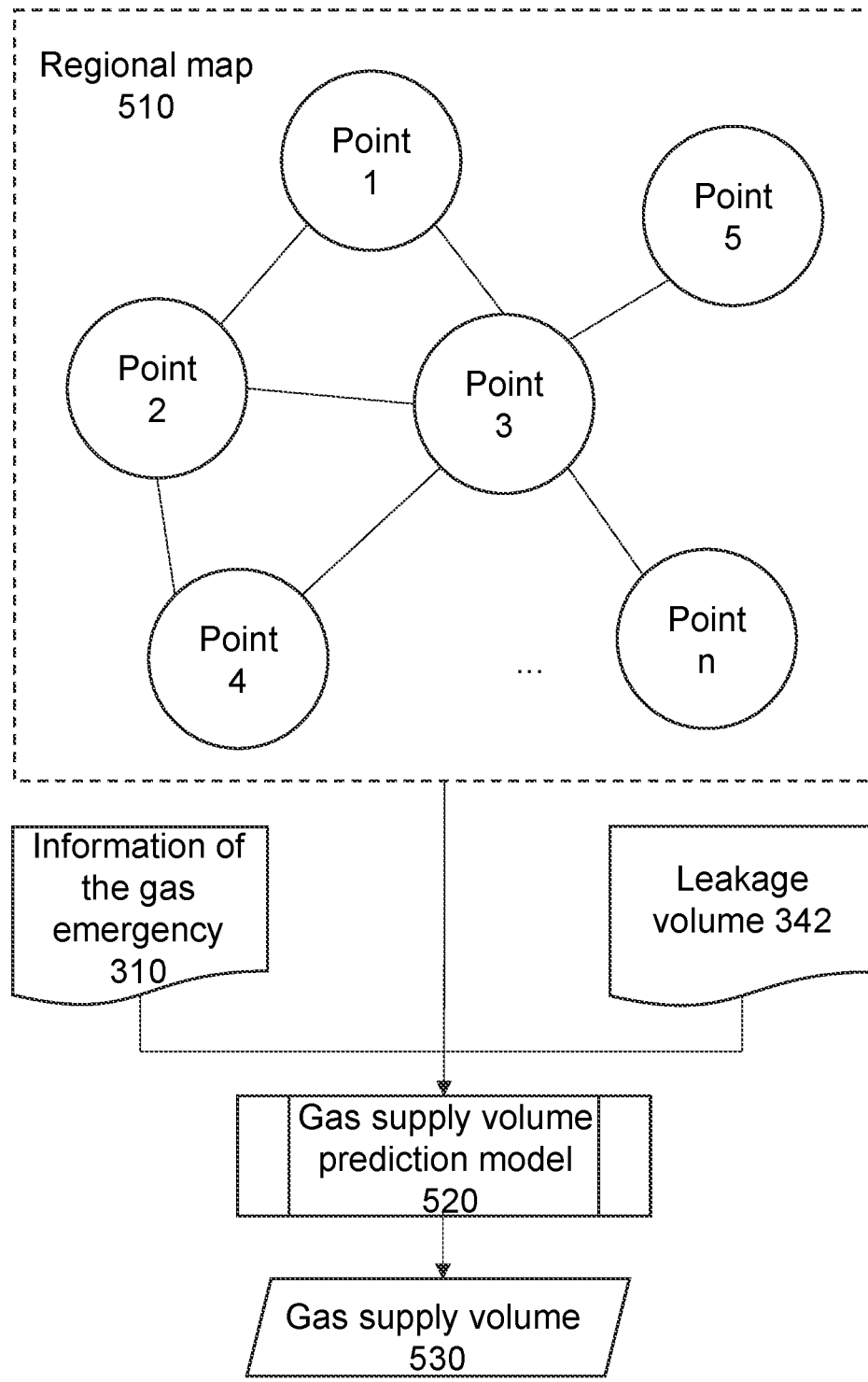
FIG. 5 is a schematic diagram illustrating determining a gas supply volume based on a gas supply volume prediction model according to some embodiments of the present disclosure.

FIG. 5 is a schematic diagram illustrating determining a gas supply volume based on a gas supply volume prediction model according to some embodiments of the present disclosure.

In some embodiments, the smart gas management platform may predict a gas supply volume of an affected region and a surrounding region through the gas supply volume prediction model based on information of the gas emergency, a leakage volume, and a regional map. The gas supply volume prediction model may be a machine learning model.

In some embodiments, the gas supply volume prediction model may be a deep neural networks model, a convolutional neural networks model, a graph neural network model, or the like, or any combination thereof.

In some embodiments, an input of the gas supply volume prediction model may be the information of the gas emergency, the leakage volume, and the regional map. An output of the gas supply volume prediction model may be the gas supply volume of the affected region and the surrounding region. The regional map may be found below and the related description thereof.

In some embodiments, the gas supply volume prediction model may be obtained through training. For example, a third training sample may be input to an initial gas supply volume prediction model, a loss function may be constructed based on labels and an output result of the initial gas supply volume prediction model, and parameters of the initial gas supply volume prediction model may be updated. When the loss function of the initial gas supply volume prediction model satisfies a preset condition, model training may be completed. The preset condition may be that the loss function converges, a count of iterations reaches a threshold, etc.

In some embodiments, the third training sample may be sample information of the gas emergency, sample leakage volumes, and sample regional maps of a plurality of gas emergencies. The third training sample may be obtained based on historical data. The labels may be actual gas supply volumes in the affected regions and surrounding region respectively corresponding to the plurality of gas emergencies. The labels may be manually labelled.

In some embodiments, the gas supply volume prediction model 520 may be the graph neural networks model. An input of the gas supply volume prediction model 520 may be the regional map 510, the information of the gas emergency 310, and the leakage volume 342. An output of the gas supply volume prediction model 520 may be the gas supply volume 530 of the affected region and the surrounding region.

The regional map 510 may refer to a network map constructed based on real-time monitoring situations of the gas pipeline networks and opening and closing plans of the gas valve of a plurality of points. In some embodiments, the regional map 510 may include node data and edge data.

The node data may include nodes and corresponding node attributes. The plurality of nodes of the regional map 510 may respectively correspond to the plurality of points in the affected region and the surrounding region. Each node may correspond to one point. As shown in FIG. 5, the regional map may include a point 1, a point 2, a point 3, a point 4, a point 5, . . . , a point n, etc. The point may refer to a point in the gas pipeline network, such as a position of the gas valve.

Different nodes may have different node attributes. The node attribute may refer to information describing the node. When the nodes represent a plurality of points, the node attributes may include the real-time monitoring situations of the gas pipeline networks and the opening and closing plans of the gas valves of the plurality of points. The node attribute may be represented by a vector.

In some embodiments, the smart gas management platform may obtain the node data in various ways. For example, the smart gas management platform may automatically obtain the node data through pipeline network equipment. As another example, the smart gas management platform may obtain the node data through a storage device. The smart gas management platform may also obtain the node data in any way known to those skilled in the art.

The edge data of the regional map may include an edge and a corresponding edge attribute. In some embodiments, the edge of the regional map may correspond to a connecting line between the nodes. The edge attribute may be a distance between the gas pipelines. If there are a plurality of gas pipelines between two points, the edge attribute of the edge connecting the nodes corresponding to the two regions may represent a length corresponding to a gas pipeline with a shortest distance.

In some embodiments, the smart gas management platform may determine the edge data of the regional map in various ways. For example, the smart gas management platform may obtain the edge data of the regional map through the historical data. As another example, the smart gas management platform may obtain the edge data through the storage device. The smart gas management platform may also obtain the edge data in any way known to those skilled in the art.

In some embodiments, the smart gas management platform may construct the regional map based on the obtained node data and edge data.

In some embodiments, the information of the gas emergency 310 may be represented by a feature vector. Different elements in the feature vector may represent a time, a location, a cause, a caliber of the leakage pipeline, and a leakage type of the gas emergency, respectively.

In some embodiments, the output of the gas supply volume prediction model 520 may be a vector composed of the gas supply volume of the affected region and the surrounding region corresponding to each point. Each element in the vector may respectively represent the gas supply volume of the affected region and the surrounding region corresponding to points 1-n.

In some embodiments, the gas supply volume prediction model may be trained based on training data. The training data may include a fourth training sample and a label. For example, the fourth training sample may include historical information of a gas emergency corresponding to a historical gas emergency, a historical leakage volume, and a historical regional map determined based on the historical data. The node and the node attribute, and the edge and the edge attribute of the historical regional map may be similar to those of the regional map. The label of the fourth training sample may be a gas supply volume of a historical affected region and a historical surrounding region corresponding to the historical gas emergency.

By determining the points in the plurality of gas pipeline networks as the nodes of the regional map and determining the real-time monitoring situations of the gas pipeline networks at the plurality of points and the opening and closing plans of the gas valves as the node attributes, the real-time gas supply situations of the points can be grasped in real time, and the emergency response plan can be determined based on the situations in a targeted manner. The plurality of points may be analyzed simultaneously based on the regional map structure, which can improve the calculation efficiency and make the process of determining the gas supply volume of the affected region and the surrounding region more efficient.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These modifications, improvements, and amendments are intended to be suggested by the present disclosure, and are within the spirit and scope of the exemplary embodiments of the present disclosure.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for handling an emergency based on a call center of smart gas, performed by a smart gas management platform of an Internet of Things (IoT) system for handling an emergency based on a call center of smart gas, wherein the IoT system for handling the emergency based on the call center of smart gas includes a smart gas user platform and a smart gas service platform, the method comprising:
   obtaining information of a gas emergency based on a call answered by the call center of smart gas;
   determining severity of the gas emergency based on the information of the gas emergency, wherein the gas emergency is a gas leakage event, and the determining severity of the gas emergency based on the information of the gas emergency includes:
      predicting a severity of the gas leakage event through a severity prediction model based on the information of the gas emergency and a real-time monitoring situation of a gas pipeline network, wherein the severity prediction model is a machine learning model, and the severity prediction model includes a leakage prediction layer and a severity prediction layer, wherein an input of the leakage prediction layer includes the information of the gas emergency and the real-time monitoring situation of the gas pipeline network, an output of the leakage prediction layer includes a leakage volume and an affected region, an input of the severity prediction layer includes the leakage volume, an affected region, and environmental information, and an output of the severity prediction layer includes the severity of the gas leakage event;

automatically determining an emergency response plan of the gas emergency based on the information of the gas emergency and the severity of the gas emergency, wherein the automatically determining an emergency response plan of the gas emergency based on the information of the gas emergency and the severity of the gas emergency includes:

predicting, by a gas supply volume prediction model, a gas supply volume of a gas pipeline network in an affected region and a surrounding region based on the information of the gas emergency, wherein the gas supply volume prediction model is a machine learning model;

determining whether the gas supply volume satisfies a preset gas supply volume condition; and in response to a determination that the gas supply volume does not satisfy the preset gas supply volume condition, determining a gas replenishment plan and prompting a user; and generating a remote control instruction based on the emergency response plan and sending the remote control instruction to the smart gas service platform, and sending the remote control instruction to the smart gas user platform based on the smart gas service platform to make the smart gas user platform to perform the emergency response plan.

2. The method of claim 1, wherein the IoT system for handling the emergency based on the call center of smart gas further includes: a smart gas sensor network platform and a smart gas object platform;

the smart gas object platform is configured to obtain a real-time monitoring situation of a gas pipeline network, and transmit the real-time monitoring situation of the gas pipeline network to the smart gas management platform through the smart gas sensor network platform.

3. The method of claim 1, wherein the gas emergency is a gas leakage event, and the determining severity of the gas emergency based on the information of the gas emergency includes:

determining severity of the gas leakage event based on the information of the gas emergency and a real-time monitoring situation of a gas pipeline network.

4. The method of claim 1, wherein the emergency response plan includes an opening and closing plan of a gas valve of a gas gate station, and the automatically determining an emergency response plan of the gas emergency based on the information of the gas emergency and the severity of the gas emergency includes:

automatically determining the opening and closing plan of the gas valve based on the information of the gas emergency and the severity of the gas emergency.

5. An Internet of Things (IoT) system for handling an emergency based on a call center of smart gas, wherein the IoT system for handling the emergency based on the call center of smart gas includes a smart gas management platform, a smart gas user platform, and a smart gas service platform, and the smart gas management platform is configured to:

obtain information of a gas emergency based on a call answered by the call center of smart gas;

determine severity of the gas emergency based on the information of the gas emergency, wherein the gas emergency is a gas leakage event, and the determining severity of the gas emergency based on the information of the gas emergency includes:

predicting a severity of the gas leakage event through a severity prediction model based on the information of the gas emergency and a real-time monitoring situation of a gas pipeline network, wherein the severity prediction model is a machine learning model, and the severity prediction model includes a leakage prediction layer and a severity prediction layer, wherein an input of the leakage prediction layer includes the information of the gas emergency and the real-time monitoring situation of the gas pipeline network, an output of the leakage prediction layer includes a leakage volume and an affected region, an input of the severity prediction layer includes the leakage volume, an affected region, and environmental information, and an output of the severity prediction layer includes the severity of the gas leakage event;

automatically determine an emergency response plan of the gas emergency based on the information of the gas emergency and the severity of the gas emergency, wherein the smart gas management platform is further configured to:

predict, by a gas supply volume prediction model, a gas supply volume of a gas pipeline network in an affected region and a surrounding region based on the information of the gas emergency, wherein the gas supply volume prediction model is a machine learning model;

determine whether the gas supply volume satisfies a preset gas supply volume condition; and in response to a determination that the gas supply volume does not satisfy the preset gas supply volume condition, determine a gas replenishment plan and prompt a user; and generate a remote control instruction based on the emergency response plan and send the remote control instruction to the smart gas service platform, and send the remote control instruction to the smart gas user platform based on the smart gas service platform, to make the smart gas user platform to perform the emergency response plan.

6. The IoT system of claim 5, wherein the IoT system for handling the emergency based on the call center of smart gas further includes: a smart gas sensor network platform and a smart gas object platform;

the smart gas object platform is configured to obtain a real-time monitoring situation of a gas pipeline network, and transmit the real-time monitoring situation of the gas pipeline network to the smart gas management platform through the smart gas sensor network platform.

7. The IoT system of claim 5, wherein the gas emergency is a gas leakage event, and the smart gas management platform is further configured to:

determine severity of the gas leakage event based on the information of the gas emergency and a real-time monitoring situation of a gas pipeline network.

8. The IoT system of claim 5, wherein the emergency response plan includes an opening and closing plan of a gas valve of a gas gate station, and the smart gas management platform is further configured to:

automatically determine the opening and closing plan of the gas valve based on the information of the gas emergency and the severity of the gas emergency.

* * * * *